United States Patent [19]
Rider et al.

[11] Patent Number: 5,499,234
[45] Date of Patent: Mar. 12, 1996

[54] METHOD FOR RECHARGING FLOODED CELL BATTERIES

[75] Inventors: Robert A. Rider, Indianapolis; Richard M. Bendert, Pendleton, both of Ind.

[73] Assignee: General Motors Corporation, Detroit, Mich.

[21] Appl. No.: 233,795

[22] Filed: Apr. 26, 1994

[51] Int. Cl.$^6$ .................................................. H01M 10/44
[52] U.S. Cl. .................................................. 320/5; 320/46
[58] Field of Search ............................. 320/4, 5, 21, 43, 320/46

[56] References Cited

U.S. PATENT DOCUMENTS

| | | | |
|---|---|---|---|
| 3,901,729 | 8/1975 | Duddy | 320/46 |
| 4,385,269 | 5/1983 | Aspinwall et al. | 320/21 X |
| 4,931,367 | 6/1990 | Brecht et al. | 320/4 X |

Primary Examiner—Peter S. Wong
Assistant Examiner—Edward Tso
Attorney, Agent, or Firm—Vincent A. Cichosz

[57] ABSTRACT

Maintenance free flooded electrolyte battery cycle life is extended by controlling charge acceptance and gassing during recharge. Charge acceptance is improved by periodically discharging the battery during a portion of the recharge which removes surface charge and reduces overall cell voltage. Gassing is purposefully introduced during periodic supply currents which are interspersed with the periodic discharges of the battery. The supply currents both restore energy to the battery and agitate the electrolyte sufficient to destratify same thereby reducing plate damage and charge gradients thereon. The method results in shorter charge times, full capacity recharges and extended cycle life resulting therefrom and from reductions in corrosive interactions of the electrolyte with the battery plates.

5 Claims, 6 Drawing Sheets

5,499,234

METHOD FOR RECHARGING FLOODED CELL BATTERIES

BACKGROUND OF THE INVENTION

This invention is directed toward a method for recharging electrochemical battery systems. More precisely, a method suitable for use in systems characterized by high depth discharge maintenance free batteries.

Electric utility power grid applications utilize batteries to store energy during off-peak demand periods of operation for subsequent discharge during peak demand periods. Similarly, high power usage customers may use similar systems to advantageously store energy during off-peak periods for use later in order to take advantage of lower rates during the off-peak periods. Such systems are typified by deeply discharged, relatively large flooded cell batteries. Each battery may have plates upwards of three feet in height with a correspondingly tall battery case and may occupy a large footprint. These batteries are often times custom designed and hand built which results in substantial cost penalties associated therewith.

It is well recognized that, especially with deep discharges, the electrolyte in flooded cell batteries undergoes considerable stratification upon recharge. Left unaddressed, electrolyte stratification will result in plate damage due to the higher acid concentration of electrolyte reacting corrosively at the bottoms thereof. Additionally, there will exist a charge gradient from top to bottom of the plates which may cause early termination of a recharge. The battery thereby never reaches its full capacity and suffers from gradual capacity losses throughout its life. These problems may be more pronounced with larger batteries as described.

One manner of dealing with electrolyte stratification which has been practiced is to introduce mechanical agitation to the electrolyte. Bubblers have been installed in battery cells but adds greatly to cost, complexity and maintenance required. Another alternative is to recharge the battery so that gassing occurs and destratifies the electrolyte. Of course, this is not wholly desirable because it requires certain additional burdens. Water losses associated with gassing results in a battery system that requires an expensive and often unreliable watering system or a maintenance free battery system with a greatly reduced cycle life due to irreplaceable water losses.

A further drawback to flooded cells is that the gas recombination is not as efficient as in starved electrolyte batteries due to lack of an efficient transport medium such as a glass mat between the plates. Therefore, cycle life of these flooded cells are very sensitive to excess gas evolution since more of the gas evolved will be dissipated out of the system resulting in water losses which are not replaceable. For these reasons, conventional recharge methods rely to a great extent upon absolute minimal gas evolution through precise voltage control especially toward the end of recharge where the effects of too high a voltage upon gas evolution are most pronounced. Of course, too conservative a voltage controlled recharge undesirably results in excessive charge time.

Therefore, in terms of a wholly maintenance free battery system, the cycle life limiting factors and eventual causes of battery failure are water loss through gassing or stratification and associated plate damage.

SUMMARY OF THE INVENTION

Therefore, one object of the present invention is to restore deeply discharge flooded cell batteries to a full state of charge with minimal per cycle water loss.

Another object is to prevent the deleterious corrosive effects of high acid concentration electrolyte upon the battery plates.

Yet another object of the present invention is to provide a recharge method for flooded cell batteries which extends the cycle life thereof.

Still another object of the present invention is to provide for a recharge substantially well suited for mass produced maintenance free flooded cell batteries.

These and other objects are obtained by the presently disclosed inventive recharge method for deeply discharge flooded cell batteries wherein the battery undergoes a recharge designed to restore a substantial portion of the previous discharge cycle energy removed. Recharge is performed to restore the battery to within a few percentage points of a 100% state of charge.

After the bulk of the capacity has been restored, energy is restored to the battery by periodic currents delivered to the battery and periodic currents removed therefrom. The magnitude and duration of the charge current are chosen so as to control the battery voltage response to thereby provide high charge rates accepted by the battery for a portion of the duration and to provide controlled gassing for the remainder of the duration. The magnitude and duration of the discharge current are chosen so as to significantly remove surface charge accumulation and charge gradients from the battery plates thereby significantly increasing the battery charge acceptance during the immediately next charge current pulse.

According to another aspect of the invention, the magnitude of the charge current within each period is dynamically controlled to effect the rate of gas generation, abbreviate the charge current period and thereby advantageously reduce the overall period and increase the charge rate.

DETAILED DESCRIPTION OF THE DRAWINGS

Although not illustrated, a conventional twelve (12) volt flooded cell lead-calcium battery system was used in the development of the present exemplary embodiment of the invention. The free electrolyte utilized in the battery is a conventional water-diluted sulfuric acid. The curves in FIGS. 1A & 1B and other figures herein that were generated from data are representative of such a battery system. Other flooded battery systems are equally well benefitted by the present invention including, for example, any of a variety of antimonial-lead and lead-calcium flooded cell batteries. Programmable battery chargers were utilized to automate the recharge method of the present invention although varying degrees of automation sophistication in practicing the present invention are fully contemplated. Some examples of commercially available programmable battery chargers sufficient to carry out the invention are Bitrode LCN battery cycler available from Bitrode Corporation, Fenton, Mo. and IDK REJUVENATOR available from IDK Technologies Inc., New Orleans, La. Additionally, custom battery chargers and charge control systems may be adapted for implementing the method of recharge encompassed by the invention.

Figure 1A:
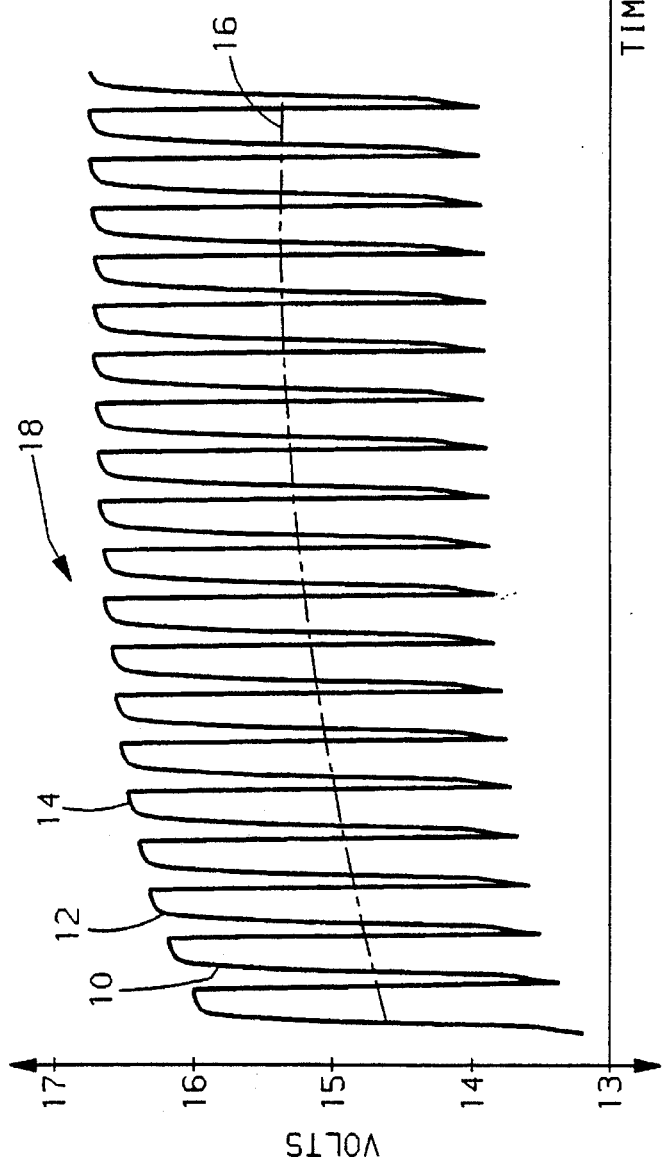
FIGS. 1A & 1B illustrate generally an initial periodic supply current and battery voltage response thereto in accordance with the present invention.
Figure 1B:
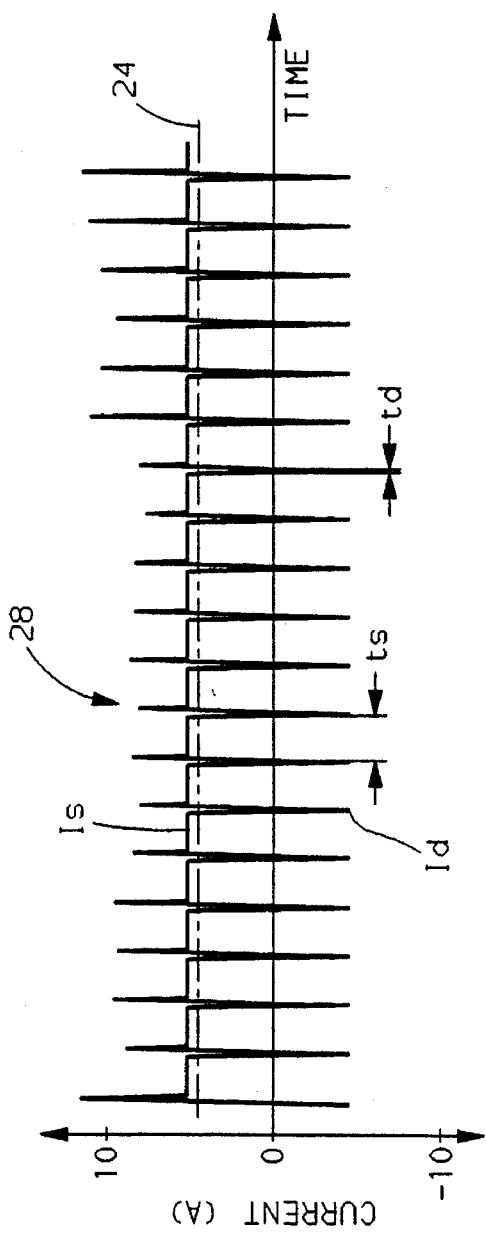

With reference first to FIGS. 1A & 1B, a graphical plot of battery charge and response data is illustrated. The snapshot of the battery recharge shown in the figure corresponds substantially to the initiation of a pulse charge/discharge portion of a recharge (hereinafter PCD) performed in accordance with one embodiment of the present invention. Time is scaled along the horizontal axis in minutes and voltage and current are scaled along the left and right vertical axes respectively.

The curve of FIG. 1B generally illustrates a periodic current 28 comprising a periodic supply current (Is) delivered to the battery for a supply duration (ts) and illustrated at a magnitude of substantially 5.0 amps. Periodic current 28 further comprises a periodic discharge current (Id) removed from the battery for a discharge duration (td) and illustrated at a magnitude of substantially −5.0 amps. Supply current Is is shown to be substantially constant through time period ts with the exception of some transient current spikes having negligible effect but which nonetheless may be filtered away or otherwise controlled if desired. A net supply current 24 comprises the average of the periodic current 28. Net supply current 24 remains constant over time so long as the periodic current 28 remains consistent in duty cycle and current magnitudes.

The curve of FIG. 1A generally illustrates a voltage response 18 to the periodic current 28 illustrated therebelow in FIG. 1B. Voltage response is measured at the battery terminals or other convenient electrical equivalent. Voltage response 18 comprises a period in time accordance with periodic current 28 and local maximums and minimums of voltage amplitude in accordance with magnitudes and durations of periodic supply current Is and discharge current Id. In reaching a local maximum of voltage amplitude, each periodic voltage response can be seen to follow a composite positive slope with a first rate of voltage rise 10 followed by a knee or inflection 12 and finally a second rate of voltage rise 14. An average of the periodic voltage response 18 over time is labeled 16.

As indicated, FIGS. 1A & 1B illustrate an initial portion of a PCD. This is caused to occur following a battery recharge which has substantially restored energy to the battery to within several parts per hundred of 100% state of charge (hereinafter bulk recharge). While not detailed herein, several well known techniques exist for providing bulk recharge to a flooded cell battery. A monitored battery system may retain historical data of current discharged over the previous cycle and simply monitor charge returned thereto at a predetermined voltage lid until the historical and monitored quantities are substantially equivalent. Alternatively, and consistent with the exemplary embodiment, a constant current may be supplied to the battery at a substantial fraction of the nominal one-hour rate until a predetermined voltage lid is reached thereby indicating a relatively complete restoral of the full charge capacity of the battery. Of course, it is well known that due to various charging inefficiencies that either of such techniques merely approximates a full recharge and that a certain amount of overcharge is desirable in order to fully convert the active battery material and establish a true 100% capacity recharge. However, it is also well recognized that at such a relatively high state of charge the battery is extremely sensitive to additional supply current such that a greater portion of current supplied thereto goes toward furthering undesirable reactions competing with desirable material conversion and energy restoral. The battery is at this point prone to outgassing of hydrogen and oxygen due to electrolysis of the electrolyte and results in undesirable water loss.

Figures 2A, 2B:
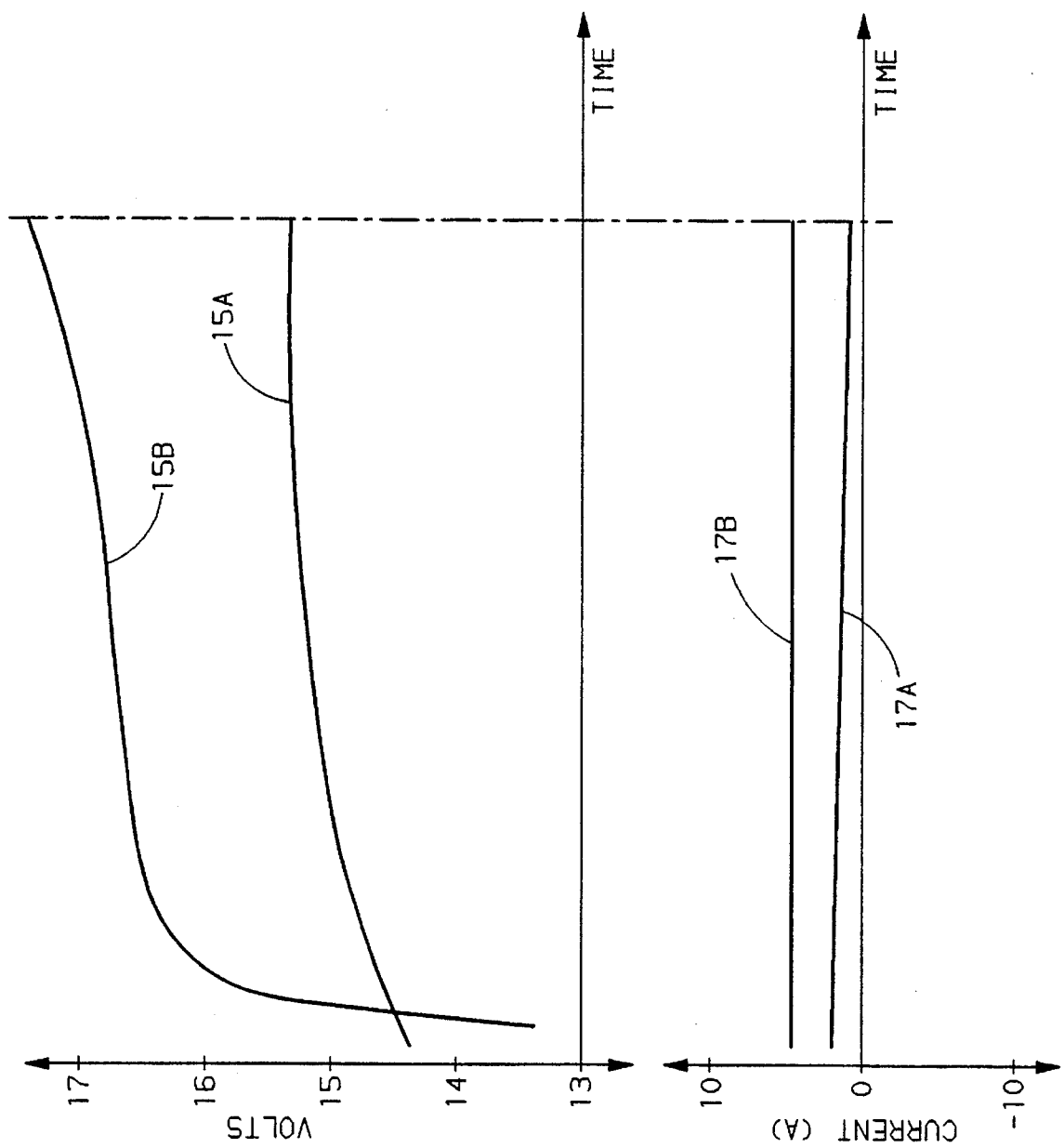
FIGS. 2A & 2B illustrate conventional high state of charge supply current and voltage response pairs.

Assuming that the PCD was supplanted by a conventional voltage controlled recharge, characteristic voltage and current curves labeled 15A and 17A, such as are illustrated in FIGS. 2A & 2B, would result. Voltage curve 15A represents the controlled voltage of the battery and supply current curve 17A represents the current supplied to the battery over time to control the voltage to the profile of curve 15A. Voltage curve 15A is shown to have substantially the same profile as the average voltage response curve labeled 16 in FIG. 1A. However, in order to maintain the battery voltage in accordance with voltage curve 15A profile, supply current would necessarily taper as illustrated in supply current curve 17A and would have substantially less magnitude than the net supply current curve 24 in FIG. 1B corresponding to the average voltage response curve 16 in FIG. 1A. Without such a taper, battery voltage would rise at a much greater rate due to reductions in the charge acceptance of the battery and surface charge accumulations resulting in undesirable gassing. The control of voltage substantially at voltage curve 15A, while controlling the gas evolution rate, has limited ability to restore charge to the battery at an acceptable rate. Additionally, low charge current does not provide significant charge per unit time. The combination of competing reactions and surface charge collection at the battery electrodes diminish the charge acceptance. This means that a long period of time is necessary to "top off" the battery and even though the rate of gas evolution is relatively small, substantial gas will evolve when integrated over the time of the recharge. Additionally, as material is converted, water is consumed and acid is put back into the electrolyte solution at the plates. The slow migration rate of acid away from the plates and consequent slow increase in water thereat also limits the charge acceptance rate due to shortages of necessary electrolyte material in the vicinity of the active material of the plates. Stratification of the electrolyte is also caused to occur resulting in higher acid concentrations at the bottom of the plates resulting in additional charge gradients at the electrodes and progressive corrosive damage thereto.

If on the other hand a net supply current was controlled at a constant value such as is illustrated as supply current curve 17B, which is shown to have substantially the same profile as the net supply current curve labeled 24 in FIG. 1B, the voltage response thereto would be substantially as illustrated as curve 15B. Voltage would rise at an unacceptably high rate at an early point in the last portion of a recharge, and much of the net supply current 17B would again result in electrolysis of the water in the electrolyte and substantial gas evolution instead of material conversion. Battery charge acceptance would be low and, therefore, the charge restoral rate would be low, with much of the supply current contributing to electrolysis and not material conversion.

With the battery recharge practiced according to the present invention, however, the charge restoral rate approaches a net supply current such as 17B with gassing rates controlled to rates heretofore associated with net supply currents of substantially less and diminishing magnitude such as 17A. High charge restoral rates with respect to the present inventive PCD means higher average charge acceptance by a battery at elevated states of charge than conventional recharge regimes such as constant current and tapered current charge regimes.

Figures 3A, 3B:
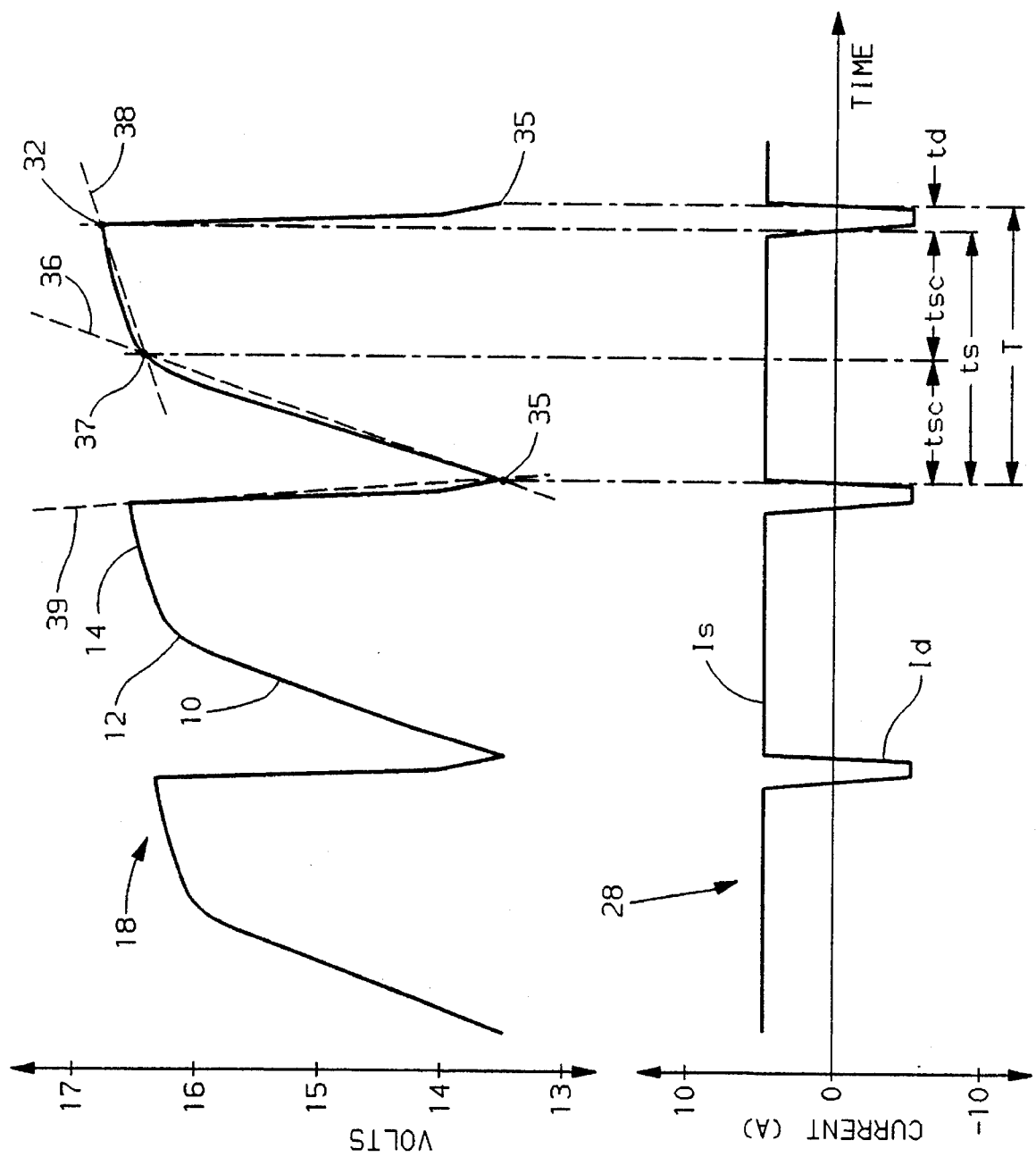
FIGS. 3A & 3B illustrate portions of periodic current and battery voltage response thereto in accordance with the present invention.

Various shortcomings of prior art recharge methods as illustrated in FIGS. 2A & 2B are successfully countered by the present invention. FIGS. 3A & 3B demonstrate the general nature of an exemplary voltage response curve obtained with a preferred recharge performed in accordance with the present invention. Portions of FIGS. 3A & 3B which are labeled the same as portions of FIGS. 1A & 1B are substantively similar. Accordingly, a portion of a voltage response curve 18 in FIG. 3A is illustrated above a corresponding portion of PCD periodic current 28 in FIG. 3B along a common horizontal time axis. The time axis is expanded for improved legibility over FIGS. 1A & 1B of the illustrated portions of the curves 18 and 28. Voltage response curve 18 can be seen having a first rate of voltage rise 10 followed by a knee or inflection 12 and finally a second rate of voltage rise 14. The composite slopes of the rising portions of voltage response curve 18 are substantially dual sloped with a first linear approximation 36 and second linear approximation 38. A further linear approximation of the negatively sloped portions of voltage response curve 18 is labeled 39 in FIG. 3A, and together with linear approximations 36 and 38 model a full period of the voltage response curve. Inflection points 35, 37 and 32 correspond to the intersections of the linear approximations 36, 38 and 39.

The horizontal time axis has designations labeling various portions of a single PCD period. "T" designates a complete period and arbitrarily runs between inflection points 35 which correspond to adjacent local voltage minimums of voltage response curve 18. This also substantially corresponds to adjacent positive going zero crossings of a single period of periodic current 28. The positive portion of periodic current 28 is labeled periodic supply current Is and has a duration ts. Similarly, the negative portion of periodic current 28 is labeled periodic discharge current Id and has a duration td. Periodic Supply current Is duration ts is substantially in phase with voltage response curve 18 through rising portions thereof (between inflection points 35 and 32). The first rate of rise 10 of voltage response curve 18 as approximated by linear approximation 36 has a duration delimited by inflection points 35–37 and has a duration "tsc". Similarly, the second rate of rise 14 of voltage response curve 18 as approximated by linear approximation 38 has a duration delimited by inflection points 37–32 and has a duration "tsg". Durations tsc and tsg in sum comprise the duration ts of periodic supply current.

Voltage response curve 18 provides a great deal of information as to how successfully the battery is accepting supply current Is. Supply current Is is substantially constant throughout duration ts. However, the battery voltage is seen to rise monotonically through the same period as evidenced by the voltage response curve 18. Beginning immediately after the battery has undergone a discharge of Id for a duration td, the battery voltage is seen to rise at a first rate approximated by linear approximation 36 for a duration tsc in response to supply current Is. The battery, coming off of a current discharge, exhibits an increased charge acceptance due to a removal of substantial surface charge accumulated and otherwise remaining on the electrodes. Therefore, the current that contributes to material conversion (charge restoral) at the battery plates at the time corresponding to the beginning of duration tsc can be substantial in both absolute terms and as a fraction of supply current Is. Progression through duration tsc yields similarly substantial material conversion. The rise in the voltage response is indicative of a build-up of surface charge and a decreasing charge acceptance resulting in a reduction in the fraction of supply current Isc contributing to material conversion. Throughout duration tsc, however, the majority of the supply current goes toward desirable charge restoring reactions within the battery. Thus, duration tsc will also be referred to specifically as charge duration tsc.

Beginning immediately after the battery has been supplied current Is for charge duration tsc, the battery voltage is seen to rise at a second rate approximated by linear approximation 38 for a duration tsg in response to the same supply current Is. The battery now exhibits a marked decreased in charge acceptance due to several factors. During charge duration tsc, surface charge has once again accumulated at the plates, active material sites thereat are lacking sufficient water to allow for material conversion and less material is left for conversion thus lessening the physical current capacity of the remainder. The current that contributes to material conversion at the battery plates at the time corresponding to the beginning of duration tsg is substantially less in both absolute terms and as a fraction of supply current Is than in the immediately prior charge duration tsc. In fact, substantial gassing is caused to occur and substantially less material conversion takes place. Therefore, more current goes toward gassing and less toward charge restoral. The rise in the voltage response is at a much lesser rate as evidenced by the substantial lessening of the slope as shown by linear approximation 38. Thus, duration tsg will also be referred to specifically as gassing duration tsg. This is typically and conventionally the voltage response avoided by prior art recharge methods.

Figures 4A, 4B:
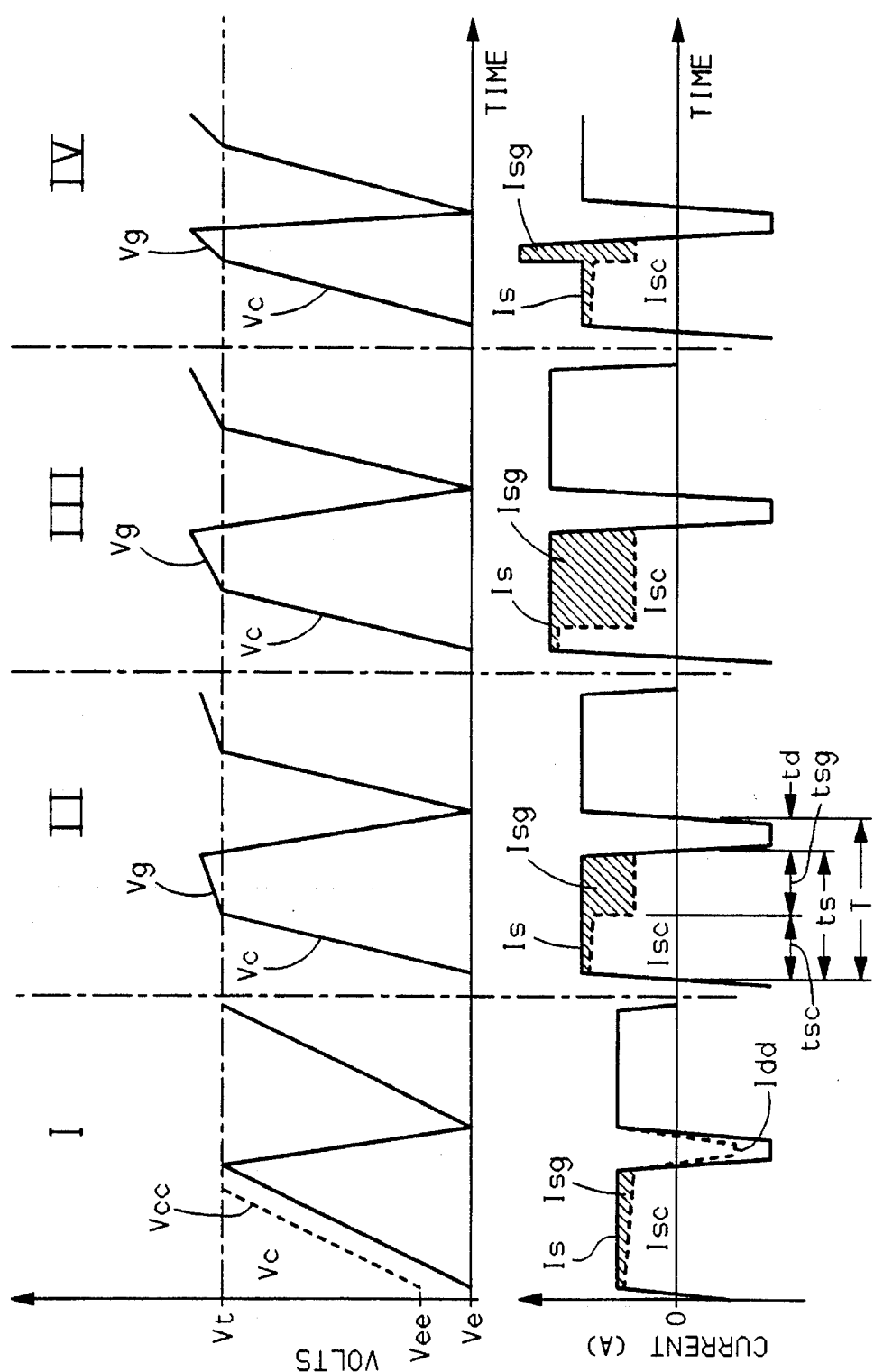
FIGS. 4A & 4B illustrate certain periodic current and battery voltage response scenarios I–IV illustrative of considerations in implementing the present invention.

The present invention purposefully controls periodic current such that gas evolution is caused to occur at a rate preferably optimized such that it is the minimum necessary to effectively agitate the electrolyte to substantially reduce stratification upon recharge, thus providing certain benefits therefrom. Specific gravity of the electrolyte in the batteries used in the present exemplary embodiment have a nominal design value of approximately 1.270. Stratification is preferably controlled such that the specific gravity of the electrolyte at the bottom of the plates does not exceed approximately 1.300 and substantially destratified electrolyte will exhibit such a specific gravity reading at the bottom of the plates. Specific gravity at the bottom of the plates of similar batteries using conventional recharge methods minimizing the rate of outgassing typically range around 1.340 to 1.350. Of course, these are exemplary figures related to the present lead-calcium battery system and other battery systems may differ therefrom. Furthermore, the gassing is believed to assist in the simple migration of high acid concentrations at the plates into solution thus providing more of the needed water at the active material sites thereby aiding in improving the charge acceptance of the battery. Of course, simple gas evolution alone only rectifies certain shortcomings associated with flooded cell batteries, namely stratification and homogenization of the electrolyte and consequent charge gradients, plate damage and reduced charge acceptance. Charge restoral, both overall and the rate thereof, must simultaneously be addressed and maximized if possible. Of course at such substantial states of charge as are contemplated herein, it becomes increasingly difficult to maintain consistently high rates of charge restoral. Without high charge restoral rates, the time it takes to reach a 100% state of charge will be quite long. The lengthy nature of restoring the last bit of charge to the battery will therefore result not only in undesirably long recharge times but also significant total gas evolution per recharge cycle even at low gas evolution rates. The scenarios I–IV of FIGS. 4A & 4B serve to aid in the explanation of the balances which are preferably struck in implementing the present invention.

FIGS. 4A & 4B are once again illustrative of periodic current curves and voltage response curves. The curves are illustrated in relative dimensions for an understanding of some key advantages and considerations of the present invention. The various scenarios I–IV illustrated in the figures are to taken as being representative of the relationships between the various PCD parameters and battery response characteristics and are not intended to illustrate absolute values for a particular battery system. Durations of charge currents and discharge currents as between scenarios labeled I–IV are shown as being equivalent for simplicity in explanation and illustration. The PCD scenario labeled II represents a preferred charge performed in accordance with the present invention to yield an overall abbreviated charge time with significantly reduced total gas evolution and destratified electrolyte. PCD scenarios labeled I and III represent non-ideal charges which fail to yield the full benefits of the present invention. Scenario IV shows yet another preferred charge performed in accordance with another aspect of the present invention.

Taking first the PCD scenario labeled II, a PCD having equivalent charge and discharge magnitudes is shown. The supply current profile is substantially linear and constant for its entire duration. Corresponding voltage response curve is shown and has a composite slope. The battery in this case is not able to accept the full supply current magnitude Is for the entire duration for which it is supplied without entering a high gassing region of voltage response. The high gassing region of voltage response is that shown above the line Vt indicating a voltage threshold. The instantaneous current can be seen to be divided into two portions—one above and one below the dashed line—as illustrated below supply current curve Is. The instantaneous current below the dashed line represents the portion of the instantaneous supply current contributing to charge restoral, hereinafter referred to as charge current Isc, and the instantaneous current above the dashed line represents the portion of the instantaneous supply current contributing to gassing, hereinafter referred to as gassing current Isg. The total area under the supply current curve Is represents the time integrated instantaneous currents and therefore the total charge supplied through duration ts. It then follows that the shaded area under the supply current curve Is represents the time integrated instantaneous gassing currents Isg. Likewise, the remaining unshaded area under the supply current curve Is represents the time integrated instantaneous charge currents Isc. A transition—shown as vertical portion of dashed line —in the proportional relationship of the two current components (Isc, Isg) of supply current Is is shown to coincide substantially with the change in slope of the battery voltage response curve. For the duration tsc, substantial charge restoral and minimal gassing occur as evidenced by the proportional relationship of the two instantaneous current components Isc, Isg. For the duration tsg, more modest charge restoral and substantially more gassing occur as evidenced by the two instantaneous current components Isc, Isg. It can therefore be said that during charge duration battery plate material conversion dominates electrolysis of water, and that during gassing duration electrolysis of water dominates battery plate material conversion.

It is desirable to control the gas evolution such that the rate thereof is sufficient to destratify the electrolyte and assist in acid migration away from the active material on the battery plates yet not allow gas evolution beyond that critical rate in order to minimize water loss. However, total gas evolved per PCD is also dependant upon the total time of the PCD which may be significant depending upon the rate of energy restoral to the battery.

The charge restored per period T (CR) can be modeled as a function of charge current Isc, discharge current Id over the intervals a-b, b-c and c-d corresponding to durations tsc, tsg and td respectively, the total interval a-d corresponding to the complete PCD period T:

$$CR = \int_a^b Isc(t)dt + \int_b^c Isc(t)dt + \int_c^d Id(t)dt$$

The gas evolution is substantially proportional to the gassing current and therefore the gas evolved per period T (GE) be modeled as a function of gassing current Isg over the intervals a-b and b-c corresponding to durations tsc and tsg respectively, the total interval a-c corresponding to the supply current duration ts:

$$GE = \int_a^b f[Isg(t)]dt + \int_b^c f[Isg(t)]dt$$

Division of each of the periodic quantities CR and GE by the period T yields the charge restoral rate and gas evolution rate, respectively. Total charge restored during PCD is the charge restoral rate multiplied by the duration of the PCD. Total gas evolution during PCD is the gas evolution rate multiplied by the duration of the PCD. While it may seem desirable to maximize the charge restoral rate from the standpoint of reducing overall charge time and in an effort to minimize the rate of gas evolution by avoiding entry into the high gassing voltage region, to do so may result undesirably in significant stratification of the electrolyte and correspondingly reduced cycle life, charge gradients and incomplete material conversion. By implementation of the teachings of the present invention, a controlled amount of gassing is caused to occur for the purpose of mixing the electrolyte to thereby provide for a homogenous mixture throughout. This will provide for extended plate life due to significant reductions in corrosive activity upon the battery plates and will assist in the provision of increasing the rate of charge acceptance by introducing more of the necessary water to the active material sites by assisting the migration of the acid produced during material conversion thereat.

With all else remaining equal, if one were to manipulate the supply current Is, CR and GE would both be effected in as much as the component currents Isc and Isg are affected. For example, if supply current Is were to be increased, gassing will be seen to increase substantially proportionally to the increase at least through gassing duration tsg. Additionally, the high gassing threshold voltage Vt will be reached sooner thereby decreasing the charge duration tsc, increasing the gassing duration and effecting the rate of both. Such an increased supply current scenario is illustrated as III in FIGS. 4A & 4B. It might now appear to be prudent to reduce the supply current duration ts to truncate the gassing duration tsg and bring the periodic rate of gas evolution in line with that desired to optimally destratify the electrolyte. The integrated periodic supply current Isc thereby becomes smaller, however, the integrated periodic discharge current Id remains the same—the discharge current duration and magnitude are substantially fixed in that the predictable nature of surface charge removal allows for such—thereby lessening CR disproportionately to the reduction in the period and increasing the overall PCD of the recharge cycle to the point of increased total gas evolution over that obtainable at a lower supply current. Additionally, with very large supply currents, significant reduction of supply current duration will be required to control the gassing rate thereby exacerbating the reduction in charge restoral rate.

Looking next at the non-ideal PCD scenario labeled I, a PCD having equivalent charge and discharge magnitudes is shown as the solid line curve. Once again, the supply current profile is shown to be substantially linear and constant throughout its duration. Corresponding voltage response curve is shown and does not have composite slope. The battery in this case is able to accept the full periodic current magnitude for the duration for which it is supplied ts without entering a high gassing region of response. The shaded area under the positive portion of the current curve again represents GE. Noting that this is relatively small with comparison to the area under the remaining portion of the positive portion of the current curve which represent CR, it can be seen that the fraction of the total charge through the supply current duration contributing to charge restoral is relatively large and that contributing to gassing is relatively small. Gas evolution rate is relatively low in that the gas evolved per period is small. However, total gas per recharge will ultimately be dependant upon the total time of recharge which may be significant depending upon the rate at which charge is restored to the battery. In order that the voltage response curve of A does not reach a high gassing voltage magnitude, a combination of low supply currents and shortened supply current durations are required. As the current is reduced, the charge time will be increased thus increasing the overall time of the PCD an total gas evolution. Larger charge currents will at some point require limitations on their durations lest the voltage response curve take on a significant positive slope and reach a high gassing voltage for a portion thereof. This too increases overall time of PCD necessary for complete charge restoration. Significant water loss may result from lengthened PCD without any destratification benefits due to an insufficient gas evolution rate.

It might seem desirable to reduce the discharge current magnitude and/or duration in an effort to reduce the subtractive effect it has upon the charge restoral. It is obvious that too much discharge in magnitude or duration will increase charge time due to each period losing more charge in relation to the amount contributed toward charge restoral. However, not enough discharge in magnitude or duration will not effectively reduce the surface charge thereby resulting in an increased entry point voltage on the voltage response curve, a shorter charge current duration and lessened charge acceptance. A reduced magnitude of discharge current with an equivalent duration is modeled as the dashed line discharge current Idd in scenario I. The broken line voltage response Vcc is likewise illustrated and corresponds to the battery voltage response after such a reduced magnitude discharge. The entry point voltage for the charge region is higher at Vee and the threshold Vt would be reached in less time thereby necessitating a reduction in the duration of the supply current to avoid significant gassing. As long as the voltage response curve remains out of the high gassing voltage region, simple current integration could be used to set an optimum current magnitude and duration. Even with optimization, however, charge durations are quite long owing to the relatively small current magnitude and therefor still result in substantial water loss per recharge cycle without destratification benefits.

To this point, discussion has been limited to PCD supply current characterized by constant profiles (i.e. fixed magnitudes over supply duration). Substantial gains have been realized even with such limitations placed on the current magnitudes and simplicity in implementation makes fixed profile supply currents an attractive choice. Programming of a programmable charger will be relatively simple where fixed supply current magnitudes are utilized and, indeed, less sophisticated programmable chargers may be limited to such requirement. Another preferred PCD supply current having dynamic range at least through a portion of the supply current duration may provide additional benefits over those of the previously described fixed magnitude supply currents. For example, the element of dynamic range control of the supply current through the high gassing region will allow for finer control over the gassing therein. The ability to control precisely the gassing current Isg magnitude during gassing durations tsg may allow for an optimal combination of charge current Isc magnitude and duration to maximize charge restoral which otherwise would be compromised by limitations placed thereon by virtue of magnitudinally equivalent charge and gassing currents as would otherwise be the case with a fixed supply current magnitude. Therefore, optimal charge currents and durations thereof can be married with high gassing currents and significantly abbreviated durations thereof. It would therefore take even less time to restore full charge to the battery thus resulting in even less total water loss and concomitant increased cycle life. Such an improvement is illustrated as scenario IV in FIGS. 4A & 4B. It can be said that the supply current profile changes through its duration or alternatively that the supply current has one or more profiles through distinct portions of the entire supply current duration. As can be seen from an examination of the figure, the overall period of the PCD is reduced yet CR per period is substantially the same as in scenario II. The result is a higher overall charge restoral rate due to the reduced period. Also, since the period is abbreviated, the amount of gas required to be evolved in the period is less than in scenario II. Forced gas evolution is caused to occur more frequently at a reduced periodic rate in order to maintain the desired overall evolution rate.

The present exemplary embodiment current magnitudes and durations were determined empirically with constant value currents throughout the entire time of PCD. A twelve volt-lead calcium flooded cell battery was utilized in a conventional recharge comprising a bulk recharge wherein a constant current recharge at 25 amps to a 16 volt lid was performed from 25%, 50% and 80% depths of discharge followed by a conventional constant current top off charge. The conventional recharges were performed in accordance with durations and currents which have provided best results for the conventional techniques. Typical recharge time for an 80% depth of discharge battery using the conventional technique is 24 hours. Data were collected for gas evolution (water loss in cc), and time to end of charge Teoc. These data were used as a baseline for improvements thought obtainable by implementation of the present recharge regime.

Current magnitudes and durations as mentioned were established through well known design of experiment techniques in arriving at the values for the particular lead-calcium battery system utilized therein. The experimental recharges comprised a bulk recharge wherein a constant current recharge at 25 amps to a 16 volt lid was performed from 25%, 50% and 80% depths of discharge followed by a PCD to top off the battery. Similarly, data were recorded for gas evolution, stratification and time to end of charge. The preferred PCD currents yielded from experimentation on an 80% depth of discharge twelve volt lead-calcium battery system are as follows:

Supply Current Is=5 amps
Supply Current Duration tsc=100 seconds
Discharge Current Id=5 amps
Discharge Current Duration td=12 seconds Preferred PCD currents for other deep discharges are substantially similar and the table below reflects the same PCD currents for all depths of discharge (%DOD) shown. Both the conventional constant voltage recharge data (CV) and the PCD data corresponding to the preferred magnitudes and durations of PCD currents are illustrated in the table below. The data shows a significant reduction in water loss leading to the improved cycle life and significant reduction in charging times.

| CHARGE TYPE | % DOD | CHARGE TIME (hr) | H2O LOSS/ CHARGE (cc) |
|---|---|---|---|
| CV | 25 | 2.22 | 4.27 |
| PCD | 25 | 1.07 | 2.16 |
| CV | 50 | 4.23 | 7.61 |
| PCD | 50 | 2.32 | 5.74 |
| CV | 80 | 11.54 | 19.89 |
| PCD | 80 | 3.78 | 10.24 |
| CV | 100 | 14.02 | 23.65 |
| PCD | 100 | 5.48 | 20.30 |

Figure 5A:
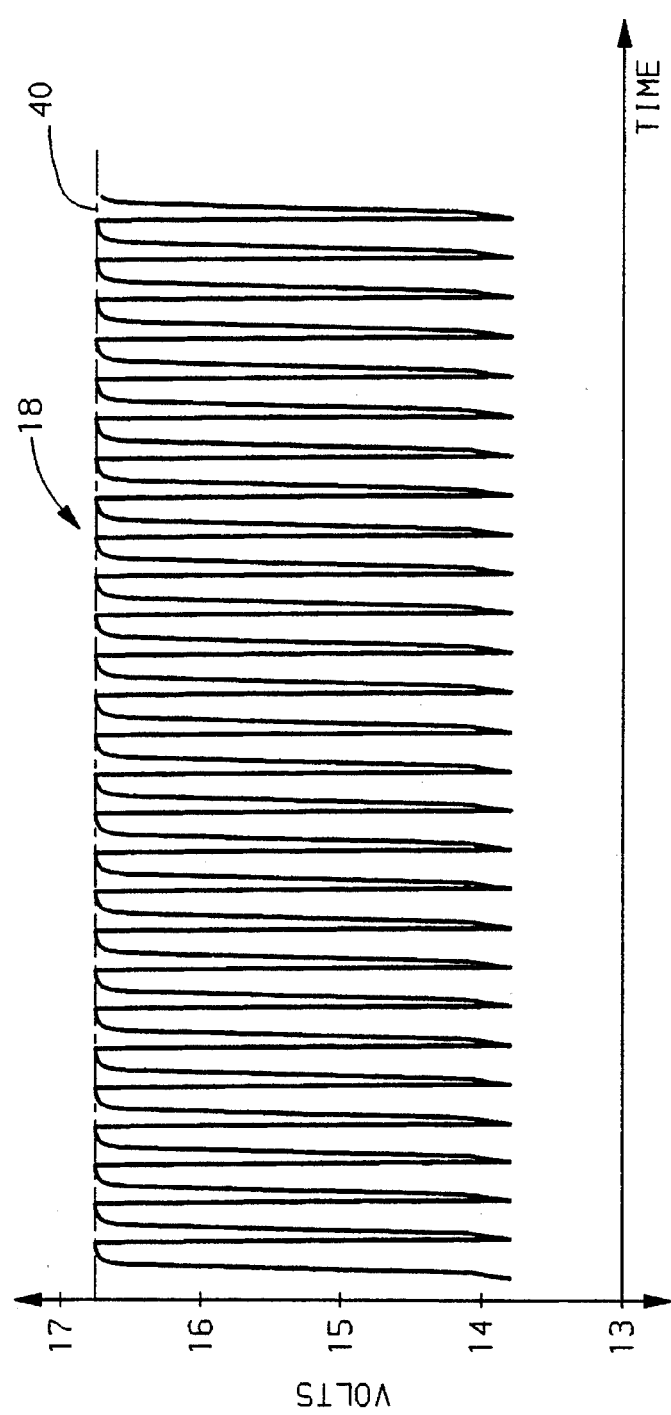
FIGS. 5A & 5B illustrate generally an ending periodic current and battery voltage response thereto in accordance with the present invention.
Figure 5B:
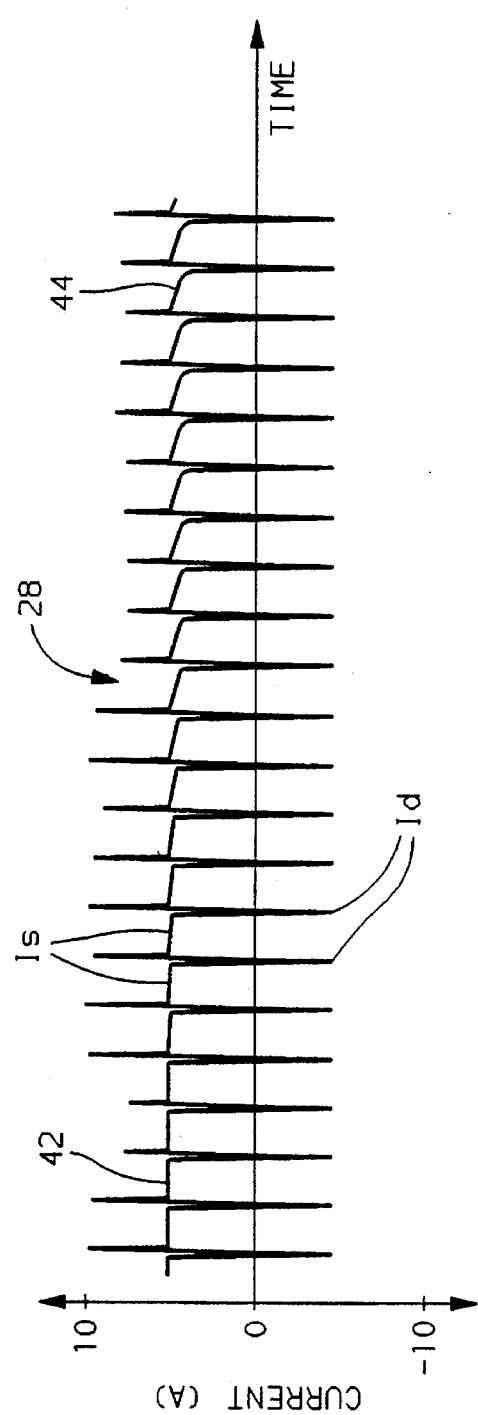

It may be preferable at the end of charge restoral to continue to maintain the battery terminal voltage at a state marginally acceptive of recharge currents if the battery is not immediately placed back into service. Conventionally, a so called voltage float charge may be applied thereto at, for example, 13.5 volts. In accordance with another aspect of the present invention, such an end of charge battery state of charge maintenance is performed with a voltage lid control during an indefinite continuation of the PCD. Referring to FIG. 5, a portion of PCD subsequent to a charge restoral portion of a PCD heretofore described with reference to the prior figures is shown. Periodic current and battery voltage response curves 28 and 18, respectively, are shown. A voltage lid control is introduced into the control to limit the peak voltage response of the battery to the PCD periodic current. The voltage lid 40 limits, or eliminates, the battery voltage response time within a high gassing region as previously discussed. As the duration of this maintenance is indefinite, the control of the present invention will effectuate a current taper or monotonically decreasing supply current profile on the supply current Is. Representative supply current waveforms are exemplified at the beginning of a maintenance portion of a PCD as 42 which shows a substantially constant supply current Is and at a later point thereof as 44 which shows an obviously tapered supply current for maintaining the voltage lid 40.

Figure 6:
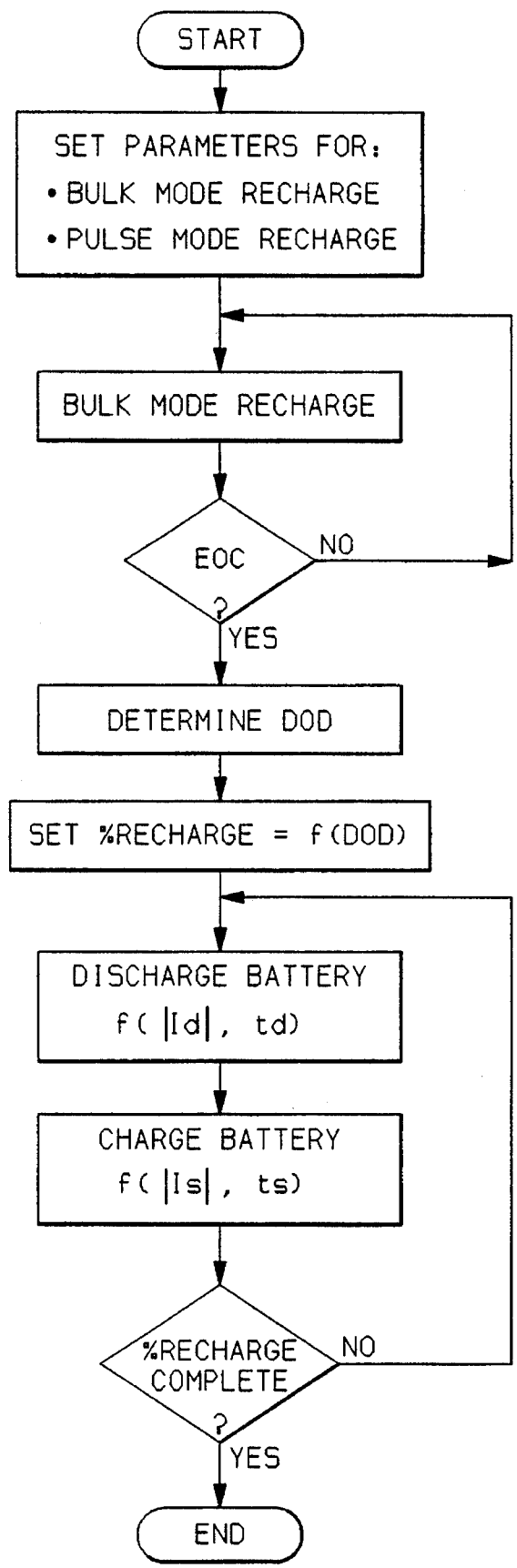
FIG. 6 illustrates certain steps for implementing the present invention using a computer controlled battery charger.

The flow chart illustrated in FIG. 6 is representative of steps followed in implementation of the recharge method of the present invention with the use of a programmable computer controlled battery charger. It is assumed that the steps of FIG. 6 are performed by computer control from a preprogrammed set of instructions and parameters. Block 610 represents initialization steps for the bulk recharge and the PCD of the entire recharge. The bulk recharge is defined in step 610 and is preferably a constant current recharge to a voltage lid. Therefore, step 610 defines the current and lid. Exemplary values for a twelve volt lead-calcium battery are 25 amps to 16 volts. Alternative bulk recharges may be equally usable, the preferred charge to voltage lid being chosen for relative simplicity in implementation. Step 610 further defines the PCD by establishing the supply current, discharge current and respective durations therefor. The preferred embodiment practiced with a twelve volt lead-calcium battery sets both supply and discharge current magnitudes equivalent in magnitude at 5 amps in accordance with satisfactory empirical results obtained therewith. Current magnitudes are preferably fixed throughout their respective durations for relative simplicity in implementation. Of course, where a particular programmable controller or custom controller allows, currents magnitudes may follow predetermined profiles as disclosed herein. The respective durations of the preferred embodiment are set at 100 seconds for the charge current and 12 seconds for the discharge current. The set-up of block 610 may be performed manually such as by inputting into a programmable charger via menu prompts and parameter selections or may simply be recalled out of memory storing a preset recharge regime. Assuming the latter implementation, the parameters are stored onto a storage medium such as floppy disk, hard disk, Programmable Read Only Memory etc. for subsequent retrieval, modification and execution as required in accordance with the present invention.

Step 615 is next encountered and performs the bulk recharge of the battery in accordance with the predetermined parameters. Thereafter at block 620, monitoring of end of bulk charge criteria such as, in the present embodiment, a voltage lid is performed to determine termination of the bulk recharge. Bulk recharge continues to completion as indicated by line 621 looping back to block 615. When the end of bulk charge is reached, the loop is exited and block 625 is next encountered.

Block 625 determines the depth of the previous discharge. This is accomplished in the present embodiment from the time it takes to reach the voltage lid in the bulk recharge normalized to a predetermined time to the same voltage lid from a 100% depth of discharge. This necessarily requires at least a characterization of the type of battery being recharged or, preferably, empirically determined time to the voltage lid from 100% depth of discharge. Alternative determinations of depth of discharge include equivalency of a previous discharge cycle's removed current and the present recharge cycle's supplied current. Block 630 is then encountered and the duration of the PCD is established as a function of the previous discharge cycle depth of discharge. All else being equal, the greater the depth of discharge, the longer the duration of the time of the PCD. The duration can be established in terms of time, periodic cycles, integrated current etc.

The PCD loop is then encountered beginning with block 635 whereat the battery experiences a discharge in accordance with the predetermined discharge current Id and duration td. Block 640 follows immediately thereafter to establish supply current to the battery in accordance with the predetermined supply current Is and duration ts. Block 645 determines if the end of PCD criteria is met and if not loops back via line 646 to block 635 for another PCD cycle. When it has been determined at block 645 that the PCD is complete, the PCD terminates.

Not illustrated in FIG. 6 would be continued PCD maintenance steps utilizing a voltage lid control as previously described. The parameters therefor would similarly be entered manually or from stored recharge routines as previously described and preferably back at block 610 with the other initialization sub-steps.

While the invention described herein has been set forth with relation to certain preferred and exemplary embodiments, it is understood that any number of variations may be apparent in implementing the invention, and that the scope of the invention is to be limited only by the scope of the appended claims and not by any limitations implied from the detailed description given herein.

The embodiments of the invention in which an exclusive property or privilege is claimed are defined as follows:

1. A method of improving cycle life of maintenance free flooded cell water-diluted electrolyte batteries comprising the steps of:
   (a) during a bulk charge cycle,
      charging the battery to substantially full capacity;
   (b) during a charge restoral portion of a pulse charge/discharge cycle,
      repetitively supplying a supply current to the battery for a supply duration at intervals interspersed with discharging a discharge current from the battery for a discharge duration, said supply current being apportioned between a gassing current effective to electrolyze water thereby evolving gas and a charge current effective to convert battery plate material thereby restoring charge, said supply duration apportioned between a charge duration wherein charge restoral dominates gas evolution and a gassing duration wherein gas evolution dominates charge restoral; and,
      controlling a combination of said supply current and said supply duration to contemporaneously yield a high charge restoral rate and a destratifying gas evolution rate.

2. A method of improving cycle life of maintenance free flooded cell water-diluted electrolyte batteries as claimed in claim 1 wherein:
   said supply current is controlled substantially constant throughout said supply duration.

3. A method of improving cycle life of maintenance free flooded cell water-diluted electrolyte batteries as claimed in claim 1 wherein:
   said supply current is controlled substantially to a first predetermined profile during said charge duration and to a second predetermined profile during said gassing duration.

4. A method of improving cycle life of maintenance free flooded cell water-diluted electrolyte batteries as claimed in claim 2 or 3 further comprising:
   during a maintenance portion of said pulse charge/discharge cycle following said charge restoral portion thereof, controlling said supply current to a monotonically decreasing profile throughout said supply duration in accordance with a predetermined battery voltage lid.

5. A method of improving cycle life of maintenance free flooded cell water-diluted electrolyte batteries comprising the steps of:
   (a) during a bulk charge cycle,
      charging the battery to substantially full capacity by supplying the battery with a substantially constant current until a predetermined battery voltage lid is attained;
   (b) during a charge restoral portion of a pulse charge/discharge cycle,
      repetitively supplying a supply current to the battery in accordance with a predetermined profile for a predetermined supply duration at intervals interspersed with discharging a predetermined discharge current from the battery for a predetermined discharge duration, said supply current being apportioned between a gassing current effective to electrolyze water thereby evolving gas and a charge current effective to convert battery plate material thereby restoring charge, said supply duration apportioned between a charge duration wherein charge restoral dominates gas evolution and a gassing duration wherein gas evolution dominates charge restoral; and,
   wherein said predetermined profile and supply duration control the battery to a high charge acceptance rate and a destratifying gas evolution rate.

* * * * *